United States Patent
Tochigi et al.

(10) Patent No.: US 11,458,984 B2
(45) Date of Patent: Oct. 4, 2022

(54) DRIVING ASSISTANCE APPARATUS

(71) Applicant: Toyota Jidosha Kabushiki Kaisha, Toyota (JP)

(72) Inventors: Kohei Tochigi, Shizuoka-ken (JP); Yuta Ikezawa, Susono (JP); Shogo Ito, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/075,106

(22) Filed: Oct. 20, 2020

(65) Prior Publication Data

US 2021/0213967 A1 Jul. 15, 2021

(30) Foreign Application Priority Data

Jan. 14, 2020 (JP) .............................. JP2020-003827

(51) Int. Cl.
  *B60W 50/08* (2020.01)
  *B60W 50/12* (2012.01)
(52) U.S. Cl.
  CPC .......... *B60W 50/087* (2013.01); *B60W 50/12* (2013.01); *B60W 2510/0609* (2013.01); *B60W 2510/18* (2013.01); *B60W 2520/105* (2013.01)
(58) Field of Classification Search
  CPC .... B60W 50/08; B60W 50/087; B60W 50/10; B60W 50/12
  See application file for complete search history.

(56) References Cited

U.S. PATENT DOCUMENTS

| 2014/0025267 A1* | 1/2014 | Tezuka | B60W 30/18027 701/51 |
| 2019/0009775 A1* | 1/2019 | Ito | B60W 30/085 |
| 2021/0094529 A1* | 4/2021 | Mizoguchi | B60W 60/0057 |

FOREIGN PATENT DOCUMENTS

JP 2014-031153 A 2/2014

* cited by examiner

*Primary Examiner* — Russell Frejd
*Assistant Examiner* — Sara J Lewandroski
(74) *Attorney, Agent, or Firm* — Dinsmore & Shohl LLP

(57) ABSTRACT

When a driver is not in pedal erroneous operation inducing situation and a rate of change in an operation amount of an accelerator pedal is equal to or greater than a first erroneous operation determination threshold value, a driving assistance apparatus determines that operation of the accelerator pedal is erroneous operation. When the driver is in the pedal erroneous operation inducing situation and the rate of change in the operation amount of the accelerator pedal is equal to or greater than a second erroneous operation determination threshold value, the riving assistance apparatus determines that the operation of the accelerator pedal is the erroneous operation, and the second erroneous operation determination threshold value is smaller than the first erroneous operation determination threshold value.

3 Claims, 3 Drawing Sheets

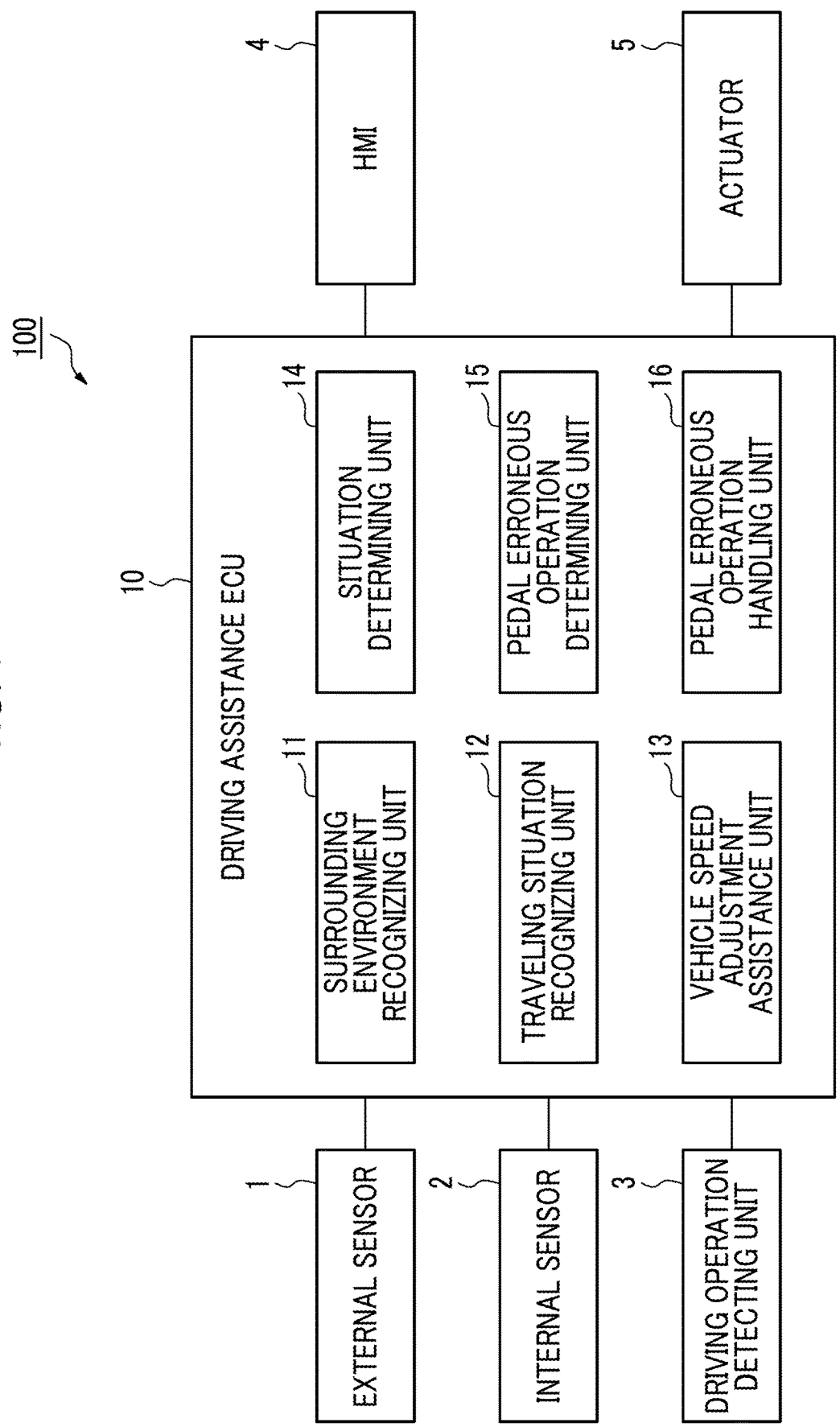

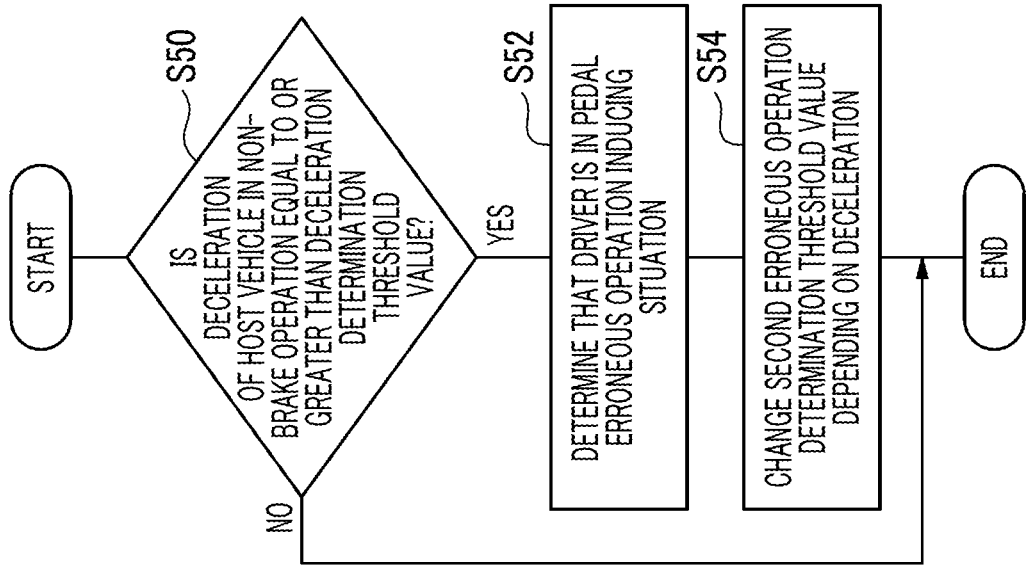
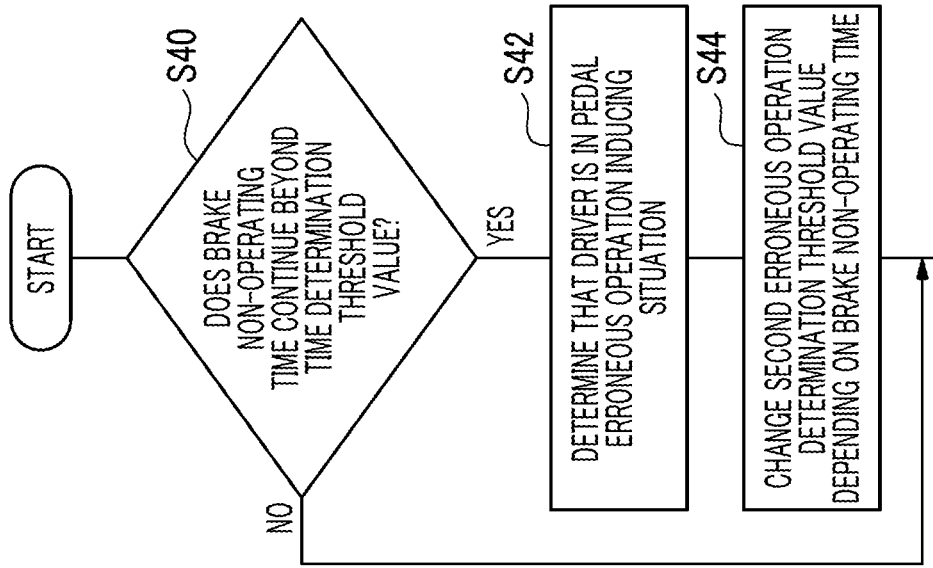
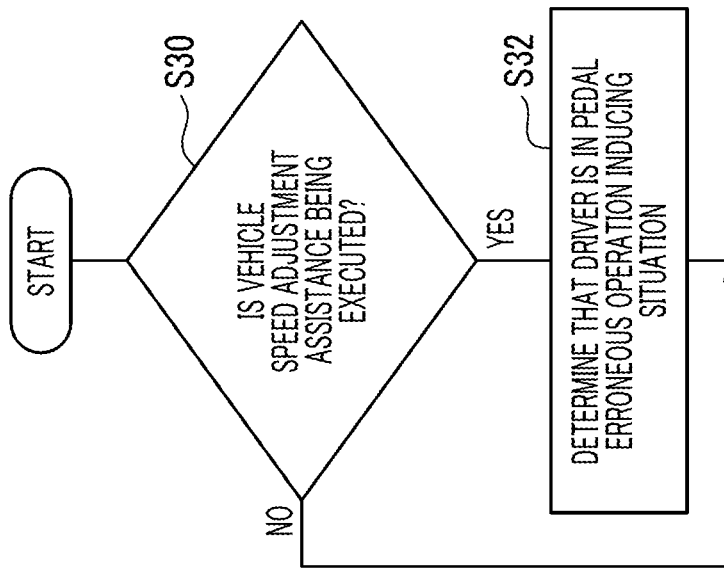

DRIVING ASSISTANCE APPARATUS

CROSS-REFERENCE TO RELATED APPLICATION

This application claims priority to Japanese Patent Application No. 2020-003827 filed on Jan. 14, 2019, incorporated herein by reference in its entirety.

BACKGROUND

1. Technical Field

The present disclosure relates to a driving assistance apparatus capable of handling an erroneous operation of an accelerator pedal.

2. Description of Related Art

In the related art, Japanese Unexamined Patent Application Publication No. 2014-031153 (JP 2014-031153 A) has been known as a technical document relating to handling of an erroneous operation of an accelerator pedal. In the publication, an apparatus is disclosed that suppresses acceleration of a host vehicle in a case where the accelerator pedal is strongly depressed when the host vehicle is traveling and a rate of change in an operation amount of the accelerator pedal exceeds a predetermined threshold value.

SUMMARY

However, the apparatus in the related art performs determination on the erroneous operation only based on the rate of change in the operation amount of the accelerator pedal, and the situation of a driver cannot be taken into consideration. Therefore, depending on the situation, acceleration of the host vehicle may be unnecessarily suppressed, and the driver may feel uncomfortable. On the other hand, when a great threshold value is used to determine the rate of change to avoid unnecessary suppression of acceleration of the host vehicle, there is a problem that acceleration of the host vehicle due to the erroneous operation of the pedal may not be appropriately suppressed.

An aspect of the disclosure relates to a driving assistance apparatus that suppresses acceleration of a host vehicle due to an operation of an accelerator pedal by a driver of the host vehicle in a case where the operation of the accelerator pedal is determined to be an erroneous operation, the apparatus including a pedal erroneous operation determining unit, a pedal erroneous operation handling unit, and a situation determining unit. The pedal erroneous operation determining unit is configured to determine whether the operation of the accelerator pedal by the driver is the erroneous operation. The pedal erroneous operation handling unit is configured to suppress acceleration of the host vehicle in a case where the pedal erroneous operation determining unit determines that the operation of the accelerator pedal is the erroneous operation. The situation determining unit is configured to determine whether the driver is in a pedal erroneous operation inducing situation based on at least one of a traveling situation of the host vehicle or an operation situation of a brake pedal by the driver. The pedal erroneous operation determining unit is configured to, in a case where the situation determining unit determines that the driver is not in the pedal erroneous operation inducing situation, determine that the operation of the accelerator pedal is the erroneous operation when a rate of change in an operation amount of the accelerator pedal by the driver is equal to or greater than a first erroneous operation determination threshold value, and configured to, in a case where the situation determining unit determines that the driver is in the pedal erroneous operation inducing situation, determine that the operation of the accelerator pedal is the erroneous operation when the rate of change in the operation amount of the accelerator pedal by the driver is equal to or greater than a second erroneous operation determination threshold value. The second erroneous operation determination threshold value is smaller than the first erroneous operation determination threshold value.

With the driving assistance apparatus according to the aspect of the disclosure, when the driver is in the pedal erroneous operation inducing situation in which the erroneous operation of the pedal is likely to occur, the operation of the accelerator pedal is likely to be determined to be the erroneous operation by using the second erroneous operation determination threshold value smaller than the first erroneous operation determination threshold value used when the driver is not in the pedal erroneous operation inducing situation, and the determination on the erroneous operation of the pedal can be appropriately performed based on the driver's situation. In the driving assistance apparatus, by setting the first erroneous operation determination threshold value used in a case where the situation determining unit determines that the driver is not in the pedal erroneous operation inducing situation to a greater value, unnecessary suppression of acceleration of the host vehicle that gives uncomfortable feeling when the driver actively drives the vehicle can be reduced.

The driving assistance apparatus according to the aspect of the disclosure may further include a vehicle speed adjustment assistance unit configured to perform a vehicle speed adjustment assistance of the host vehicle based on a surrounding environment in a periphery of the host vehicle and the traveling situation of the host vehicle. In the driving assistance apparatus according to the aspect, the situation determining unit may be configured to determine that the driver is in the pedal erroneous operation inducing situation in a case where the vehicle speed adjustment assistance of the host vehicle is performed. In the driving assistance apparatus, in a case where the vehicle speed adjustment assistance of the host vehicle is performed, the frequency of operation of the brake pedal by the driver is reduced, the possibility of erroneous operation of the accelerator pedal is considered to increase compared to a case of manual driving in which the accelerator pedal and brake pedal are frequently changed, and the situation determining unit determines that the driver is in the pedal erroneous operation inducing situation. Therefore, with the driving assistance apparatus, since the operation of the accelerator pedal is likely to be determined to be the erroneous operation in a case where the vehicle speed adjustment assistance of the host vehicle is performed, the determination on the erroneous operation of the pedal can be appropriately performed based on the driver's situation.

In the driving assistance apparatus according to the aspect of the disclosure, the situation determining unit may be configured to determine that the driver is in the pedal erroneous operation inducing situation in a case where a brake non-operating time during which the driver does not operate the brake pedal continues beyond a time determination threshold value.

In the driving assistance apparatus, in a case where a state in which the driver does not operate the brake pedal continues for a long time, the possibility of erroneous operation of the accelerator pedal is considered to increase compared to a case in which the accelerator pedal and brake pedal are frequently changed by the driver, and the situation determining unit determines that the driver is in the pedal erroneous operation inducing situation. Therefore, with the driving assistance apparatus, the operation of the accelerator pedal is likely to be determined to be the erroneous operation in a case where a state in which the driver does not operate the brake pedal continues for a long time, and the determination on the erroneous operation of the pedal can be appropriately performed based on the driver's situation.

In the driving assistance apparatus according to the aspect of the disclosure, the pedal erroneous operation determining unit may be configured to decrease the second erroneous operation determination threshold value as the brake non-operating time is longer in a case where the situation determining unit determines that the driver is in the pedal erroneous operation inducing situation based on the brake non-operating time continuing beyond the time determination threshold value.

With the driving assistance apparatus, since it can be considered that as the brake non-operating time is longer, the pedal operation of the driver is more rigid and the possibility of erroneous operation of the accelerator pedal increases, by decreasing the second erroneous operation determination threshold value as the brake non-operating time is longer, the driver's situation can be more appropriately reflected in the ease of erroneous operation determination.

In the driving assistance apparatus according to the aspect of the disclosure, the situation determining unit may be configured to determine that the driver is in the pedal erroneous operation inducing situation in a case where a deceleration of the host vehicle when the driver is not operating the brake pedal is equal to or greater than a deceleration determination threshold value.

In the driving assistance apparatus, in a case where the deceleration of the host vehicle is great when the driver is not operating the brake pedal, the possibility that the driver's foot is placed on the accelerator pedal is considered to increase, and the situation determining unit determines that the driver is in the pedal erroneous operation inducing situation. Therefore, with the driving assistance apparatus, the operation of the accelerator pedal is likely to be determined to be the erroneous operation in a case where the deceleration of the host vehicle is great when the driver is not operating the brake pedal, and the determination on the erroneous operation of the pedal can be appropriately performed based on the driver's situation.

In the driving assistance apparatus according to the aspect of the disclosure, the pedal erroneous operation determining unit may be configured to decrease the second erroneous operation determination threshold value as the deceleration of the host vehicle is greater in a case where the situation determining unit determines that the driver is in the pedal erroneous operation inducing situation based on the deceleration of the host vehicle when the driver is not operating the brake pedal being equal to or greater than the deceleration determination threshold value.

With the driving assistance apparatus, since it is considered that as the deceleration of the host vehicle when the driver is not operating the brake pedal is greater, the possibility that the driver's foot is placed on the accelerator pedal to continue traveling of the host vehicle increase, by decreasing the second erroneous operation determination threshold value as the deceleration of the host vehicle is greater, the driver's situation can be more appropriately reflected in the ease of erroneous operation determination.

According to an aspect of the disclosure, determination on an erroneous operation of the pedal can be appropriately performed based on the driver's situation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram showing a driving assistance apparatus according to an embodiment;

FIG. 3A is a flowchart showing an example of a determining process of a pedal erroneous operation inducing situation based on the presence or absence of a vehicle speed adjustment assistance;

FIG. 3B is a flowchart showing an example of a determining process of a pedal erroneous operation inducing situation based on a brake non-operating time; and FIG. 3C is a flowchart showing an example of a determining process of a pedal erroneous operation inducing situation based on a deceleration of a host vehicle.

DETAILED DESCRIPTION OF EMBODIMENTS

Figures 2A, 2B:
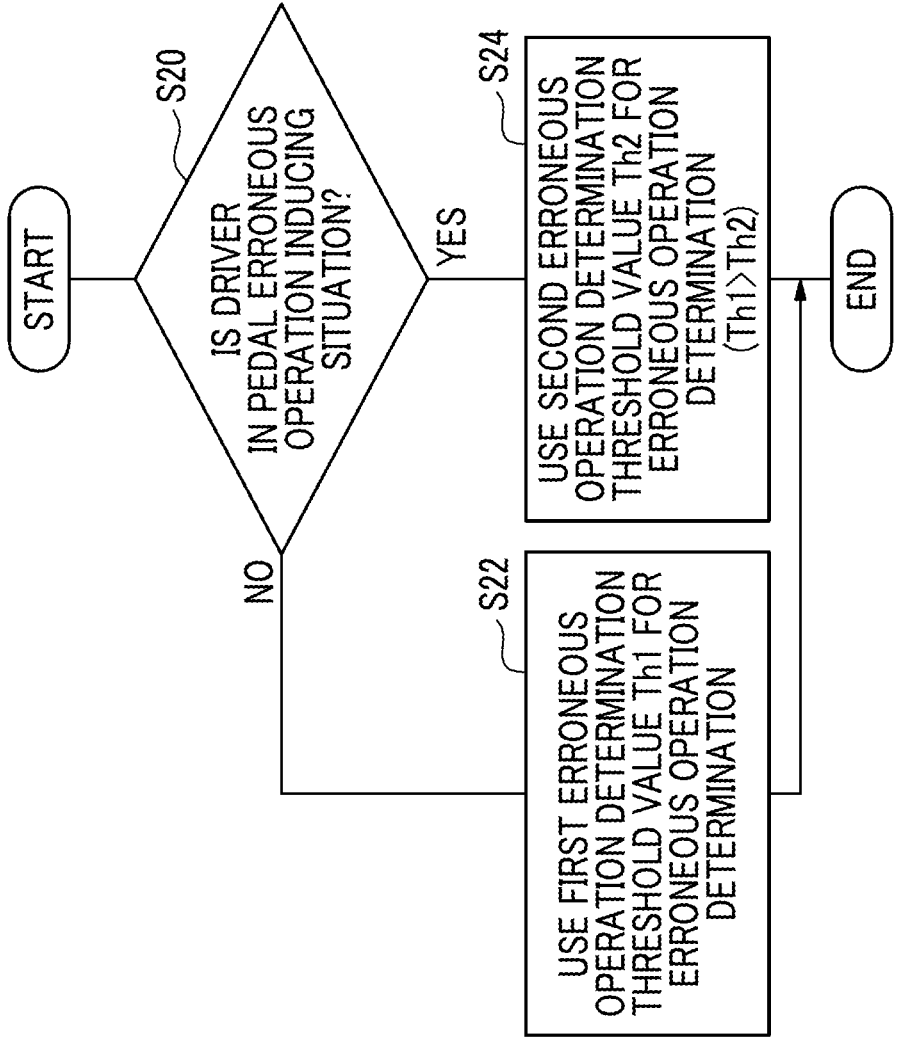
FIG. 2A is a flowchart showing an example of an erroneous operation determining process of an accelerator pedal.
FIG. 2B is a flowchart showing an example of an erroneous operation determination threshold value setting process.

Hereinafter, embodiments of the disclosure will be described with reference to the drawings.

A driving assistance apparatus 100 shown in FIG. 1 is mounted on a vehicle (host vehicle), such as a passenger vehicle, and is an apparatus that assistances driving of host vehicle by a driver. The driving assistance apparatus 100 performs pedal erroneous operation acceleration suppression assistance that suppresses acceleration of the host vehicle due to erroneous operation of the accelerator pedal in a case where the driver erroneously operates the accelerator pedal. The details of the pedal erroneous operation acceleration suppression assistance will be described below.

The driving assistance apparatus 100 also performs the vehicle speed adjustment assistance of the host vehicle. The vehicle speed adjustment assistance is driving assistance that automatically adjusts the vehicle speed of the host vehicle in accordance with the surrounding environment of the host vehicle and the traveling situation of the host vehicle. The vehicle speed adjustment assistance is, for example, adaptive cruise control (ACC). An example of ACC includes a control of performing a constant speed control of causing the host vehicle to travel at a constant speed at a preset speed in a case where no preceding vehicle is present in front of the host vehicle, and a follow-up control of adjusting the vehicle speed of the host vehicle depending on a following distance between the host vehicle and the preceding vehicle in a case where the preceding vehicle is present in front of the host vehicle. The vehicle speed adjustment assistance may be cooperative adaptive cruise control (CACC) that uses intervehicle communication for vehicle speed adjustment with the preceding vehicle.

Alternatively, the vehicle speed adjustment assistance may be deceleration assistance for decelerating the host vehicle under a predetermined condition in a case where a deceleration target, such as the preceding vehicle or a traffic signal is detected in front of the host vehicle. The deceleration target is a target for deceleration assistance. The deceleration target includes the preceding vehicle, the traffic signal, and a stop line. The deceleration target may include moving objects, such as pedestrians or bicycles in addition to the preceding vehicle, and stationary objects, such as pedestrian crossings, falling objects, installations for construction, or structures in addition to the traffic signal and the stop line. The deceleration target may include the traffic signal of the red or yellow light excluding the traffic signal of the blue light.

Configuration of Driving Assistance Apparatus

A configuration of the driving assistance apparatus 100 according to the embodiment will be described with reference to the drawings. As shown in FIG. 1, the driving assistance apparatus 100 includes a driving assistance electronic control unit (ECU) 10 that comprehensively manages the apparatus. The driving assistance ECU 10 is an electronic control unit including a central processing unit (CPU), a read only memory (ROM), a random access memory (RAM), and the like. The driving assistance ECU 10 realizes various functions by, for example, loading a program stored in the ROM into the RAM and causing the CPU to execute the program loaded into the RAM. The driving assistance ECU 10 may be formed of a plurality of electronic units.

The driving assistance ECU 10 is connected to an external sensor 1, an internal sensor 2, a driving operation detecting unit 3, a human machine interface (HMI) 4, and an actuator 5.

The external sensor 1 is a detection device that detects a surrounding situation of the host vehicle. The external sensor 1 includes at least one of a camera or a radar sensor.

The camera is an imaging device that images the surrounding environment of the host vehicle. The camera is provided, for example, on the back side of the windshield of the host vehicle, and images the front of the host vehicle. The camera transmits the imaging information on the surrounding environment of the host vehicle to the driving assistance ECU 10. The camera may be a monocular camera or a stereo camera.

The radar sensor is a detection device that detects an object in the periphery of the host vehicle using an electric wave (for example, millimeter wave) or light. Examples of the radar sensor include a millimeter wave radar or a light detection and ranging (LIDAR). The radar sensor detects an object by transmitting an electric wave or light to the periphery of the host vehicle and receiving an electric wave or light reflected by the object. The radar sensor transmits information on the detected object to the driving assistance ECU 10. The objects include fixed obstacles, such as guardrails or buildings, as well as moving obstacles, such as pedestrians, bicycles, or other vehicles.

The internal sensor 2 is a detection device that detects a traveling situation of the host vehicle. The internal sensor 2 includes a vehicle speed sensor, an acceleration sensor, and a yaw rate sensor. The vehicle speed sensor is a detector that detects the speed of the host vehicle. As the vehicle speed sensor, for example, a wheel speed sensor that is provided for the wheels of the host vehicle or a driveshaft that rotates integrally with the wheels and that detects a rotational speed of the wheels is used. The vehicle speed sensor transmits the detected vehicle speed information (wheel speed information) to the driving assistance ECU 10.

The acceleration sensor is a detector that detects the acceleration of the host vehicle. The acceleration sensor includes, for example, a longitudinal acceleration sensor that detects the longitudinal acceleration of the host vehicle and a lateral acceleration sensor that detects the lateral acceleration of the host vehicle. The acceleration sensor transmits, for example, acceleration information of the host vehicle to the driving assistance ECU 10. The yaw rate sensor is a detector that detects a yaw rate (rotational angular velocity) around a vertical shaft of the center of gravity of the host vehicle. As the yaw rate sensor, for example, a gyro sensor can be used. The yaw rate sensor transmits the detected yaw rate information of the host vehicle to the driving assistance ECU 10.

The driving operation detecting unit 3 detects the driving operation of the host vehicle by the driver. The driving operation detecting unit 3 includes an accelerator pedal sensor and a brake pedal sensor.

The accelerator pedal sensor is a sensor that detects the operation amount of the accelerator pedal by the driver. The operation amount of the accelerator pedal is, for example, the depression amount (pedal stroke amount) of the accelerator pedal by the driver. In the case of an integrated pedal in which the accelerator pedal and the brake pedal are integrated, the operation amount of the accelerator pedal corresponds to the operation amount of the integrated pedal corresponding to the acceleration request of the driver. In the integrated pedal for requesting acceleration, for example, by laterally moving a lever on the pedal by laterally shifting a foot, and for requesting deceleration by depression operation, the moving amount of the lever corresponds to the operation amount of the accelerator pedal.

The brake pedal sensor is a sensor that detects the operation amount of the brake pedal by the driver. The operation amount of the brake pedal can be, for example, the depression amount (pedal stroke amount) of the brake pedal by the driver. In the case of an integrated pedal in which the accelerator pedal and the brake pedal are integrated, the operation amount of the brake pedal corresponds to the operation amount of the integrated pedal corresponding to the deceleration request of the driver. In the integrated pedal for requesting deceleration, for example, by returning the state of the pedal from a depressed state, the pedal return amount may be detected as corresponding to the operation amount of the brake pedal. In the integrated pedal, the accelerator pedal sensor and the brake pedal sensor may be one integrated sensor.

The HMI 4 is an interface for inputting and outputting information between the driving assistance apparatus 100 and the driver. The HMI 4 includes, for example, a display and a speaker. The HMI 4 outputs an image on a display and outputs a sound from a speaker in accordance with a control signal from the driving assistance ECU 10. The display may be a head up display (HUD) or a multi information display (MID).

The actuator 5 is a device used to control the host vehicle. The actuator 5 includes at least a drive actuator and a brake actuator. The actuator 5 may include a steering actuator. The drive actuator controls the amount of air supplied to the engine (throttle opening degree) in accordance with a control signal from the driving assistance ECU 10 to control a driving force of the host vehicle. In a case where the host vehicle is a hybrid vehicle, a control signal from the driving assistance ECU 10 is input to the motor as a power source in addition to the amount of air supplied to the engine to control the driving force. In a case where the host vehicle is an electric vehicle, a control signal from the driving assistance ECU 10 is input to the motor as the power source to control the driving force. The motors as the power source in the cases constitutes the actuator 5.

The brake actuator controls a braking system in accordance with the control signal from the driving assistance ECU 10 and controls a braking force applied to the wheels of the host vehicle. As the braking system, for example, a hydraulic brake system can be used. The steering actuator controls driving of an assist motor that controls steering torque in an electric power steering system in accordance with the control signal from the driving assistance ECU 10. As a result, the steering actuator controls the steering torque of the host vehicle.

Next, a functional configuration of the driving assistance ECU 10 will be described. As shown in FIG. 1, the driving assistance ECU 10 includes a surrounding environment recognizing unit 11, a traveling situation recognizing unit 12, a vehicle speed adjustment assistance unit 13, a situation determining unit 14, a pedal erroneous operation determining unit 15, and a pedal erroneous operation handling unit 16.

The surrounding environment recognizing unit 11 recognizes the surrounding environment of the host vehicle based on the detection result of the external sensor 1. The surrounding environment includes a position of the object (for example, the deceleration target) with respect to the host vehicle, a relative speed of the obstacle with respect to the host vehicle, and a movement direction of the obstacle with respect to the host vehicle. The surrounding environment recognizing unit 11 recognizes the surrounding environment of the host vehicle by a well-known method based on the image captured by the camera and/or the obstacle information of the radar sensor.

The traveling situation recognizing unit 12 recognizes the traveling situation of the host vehicle based on the detection result of the internal sensor 2. The traveling situation includes the vehicle speed and the acceleration (deceleration) of the host vehicle. The traveling situation may include the yaw rate of the host vehicle. The traveling situation may include whether the vehicle speed adjustment assistance of the host vehicle is performed.

The vehicle speed adjustment assistance unit 13 executes the vehicle speed adjustment assistance of the host vehicle based on the surrounding environment of the host vehicle and the traveling situation of the host vehicle. For example, in a case where the driver turns on the adaptive cruise control (ACC) as the vehicle speed adjustment assistance, the vehicle speed adjustment assistance unit 13 performs adjustment of the vehicle speed automatically such that the host vehicle has a set vehicle speed by transmitting the control signal to the drive actuator and the brake actuator. In a case where the preceding vehicle is detected during execution of ACC, the vehicle speed adjustment assistance unit 13 adjusts the vehicle speed of the host vehicle such that the following distance between the host vehicle and the preceding vehicle is a preset distance.

When the deceleration target is detected in front of the host vehicle in a case where the driver turns on the deceleration assistance as the vehicle speed adjustment assistance, the vehicle speed adjustment assistance unit 13 executes the deceleration assistance of the host vehicle by transmitting the control signal to the drive actuator and the brake actuator. The vehicle speed adjustment assistance unit 13 decelerates the host vehicle to a preset target vehicle speed for each deceleration target, for example. The vehicle speed adjustment assistance unit 13 need only be able to execute at least one of ACC or the deceleration assistance as the vehicle speed adjustment assistance.

The situation determining unit 14 determines whether the driver is in the pedal erroneous operation inducing situation. The pedal erroneous operation inducing situation is a situation in which the erroneous operation of the accelerator pedal by the driver is likely to occur. The situation determining unit 14 determines whether the driver is in the pedal erroneous operation inducing situation based on at least one of the traveling situation of the host vehicle or the operation situation of the brake pedal by the driver, for example. The operation situation of the brake pedal by the driver is a situation of the brake pedal operation by the driver detected by the brake pedal sensor of the driving operation detecting unit 3.

For example, in a case where the vehicle speed adjustment assistance of the host vehicle is performed, the situation determining unit 14 determines that the driver is in the pedal erroneous operation inducing situation. In a case where the vehicle speed adjustment assistance of the host vehicle is performed, the frequency of operation of the pedal by the driver is reduced, and the possibility of erroneous operation of the accelerator pedal is considered to increase compared to a case in which the accelerator pedal and brake pedal are frequently changed by the driver.

A method of recognizing whether the vehicle speed adjustment assistance is performed is not particularly limited. The situation determining unit 14 may recognize whether the vehicle speed adjustment assistance is performed based on a switch operation of switching the vehicle speed adjustment assistance between the on state and the off state.

The situation determining unit 14 may recognize whether the vehicle speed adjustment assistance is performed based on an operation rate of the brake pedal. The operation rate of the brake pedal is a rate of the time when the brake pedal is operated to the total traveling time from the engine start of the host vehicle, for example. The operation rate of the brake pedal may be a rate of the time when the brake pedal is operated to a time from the present to a certain time. The situation determining unit 14 may determine that the driver is in the pedal erroneous operation inducing situation by assuming that the vehicle speed adjustment assistance is performed, in a case where the operation rate of the brake pedal is smaller than a brake operation rate threshold value. The brake operation rate threshold value is a preset value threshold value.

The situation determining unit 14 may recognize whether the vehicle speed adjustment assistance is performed by using an operation rate of the accelerator pedal based on the operation situation of the accelerator pedal by the driver. The operation rate of the accelerator pedal can be obtained by the same method as the operation rate of the brake pedal. The situation determining unit 14 may determine that the driver is in the pedal erroneous operation inducing situation by assuming that the vehicle speed adjustment assistance is performed, in a case where the operation rate of the accelerator pedal is smaller than an accelerator operation rate threshold value. The accelerator operation rate threshold value is a preset value threshold value.

The situation determining unit 14 may determine that the driver is in the pedal erroneous operation inducing situation based on the operation rate of the brake pedal or the operation rate of the accelerator pedal, regardless of recognizing of whether the vehicle speed adjustment assistance is performed. The pedal erroneous operation determining unit 15 may determine that the driver is in the pedal erroneous operation inducing situation by estimating the rate of the pedal operation by the driver from the distribution (distribution with respect to time) of the deceleration of the host vehicle.

The situation determining unit 14 may determine that the driver is in the pedal erroneous operation inducing situation in a case where a brake non-operating time during which the driver does not operate the brake pedal continues beyond a time determination threshold value. The time determination threshold value is a preset value threshold value. Not operating the brake pedal means, for example, a state in which the brake pedal sensor does not detect the operation of the brake pedal. The situation determining unit 14 may recognize that the brake pedal is not operated in a case where the depression amount of the brake pedal is smaller than a certain threshold value. It can be considered that as the brake non-operating time of the driver is longer, the pedal operation of the driver is more rigid and the possibility of erroneous operation of the accelerator pedal increases.

The situation determining unit 14 may determine that the driver is in the pedal erroneous operation inducing situation in a case where the deceleration of the host vehicle when the driver is not operating the brake pedal is equal to or greater than a deceleration determination threshold value. The deceleration determination threshold value is a preset value threshold value. In a case where the deceleration of the host vehicle when the driver is not operating the brake pedal is great, it can be considered that the necessity of the operation of the brake pedal by the driver is reduced and the possibility that the driver's foot is placed on the accelerator pedal increases.

The situation determining unit 14 may not determine the deceleration when the driver operates the accelerator pedal. That is, the situation determining unit 14 may determine that the driver is in the pedal erroneous operation inducing situation in a case where the deceleration of the host vehicle when the driver is not operating both the brake pedal and the accelerator pedal is equal to or greater than a deceleration determination threshold value.

The pedal erroneous operation determining unit 15 determines whether the operation of the accelerator pedal by the driver is the erroneous operation based on the rate of change in the operation amount of the accelerator pedal by the driver. The rate of change in the operation amount of the accelerator pedal corresponds to, for example, a time differential value of the operation amount of the accelerator pedal. The rate of change in the operation amount of the accelerator pedal may be the amount of change in the operation amount of the accelerator pedal in a certain period of time.

In a case where the situation determining unit 14 determines that the driver is not in the pedal erroneous operation inducing situation (a case of normal manual driving), the pedal erroneous operation determining unit 15 determines that the operation of the accelerator pedal is the erroneous operation when the rate of change in the operation amount of the accelerator pedal by the driver is equal to or greater than the first erroneous operation determination threshold value Th1. The first erroneous operation determination threshold value Th1 is a preset threshold value.

In a case where the situation determining unit 14 determines that the driver is in the pedal erroneous operation inducing situation, the pedal erroneous operation determining unit 15 determines that the operation of the accelerator pedal is the erroneous operation when the rate of change in the operation amount of the accelerator pedal by the driver is equal to or greater than the second erroneous operation determination threshold value Th2. The second erroneous operation determination threshold value Th2 is a threshold value smaller than the first erroneous operation determination threshold value Th1. That is, the pedal erroneous operation determining unit 15 likely to determine that the operation of the accelerator pedal by the driver is the erroneous operation in a case where the situation determining unit determines that the driver is in the pedal erroneous operation inducing situation as compared to a case where the situation determining unit determines that the driver is not in the pedal erroneous operation inducing situation.

In a case where the situation determining unit determines that the driver is in the pedal erroneous operation inducing situation based on the brake non-operating time continuing beyond the time determination threshold value, the pedal erroneous operation determining unit 15 changes the second erroneous operation determination threshold value Th2 depending on the brake non-operating time. The pedal erroneous operation determining unit 15 decreases the second erroneous operation determination threshold value Th2 as the brake non-operating time is longer. A lower limit value may be set to the second erroneous operation determination threshold value Th2. The pedal erroneous operation determining unit 15 may use the threshold value to gradually decrease the second erroneous operation determination threshold value Th2.

In a case where the situation determining unit determines that the driver is in the pedal erroneous operation inducing situation based on the deceleration of the host vehicle when the driver is not operating the brake pedal (in non-brake operation) being equal to or greater than the deceleration determination threshold value, the pedal erroneous operation determining unit 15 changes the second erroneous operation determination threshold value Th2 depending on the deceleration of the host vehicle in the non-brake operation. The pedal erroneous operation determining unit 15 decreases the second erroneous operation determination threshold value Th2 as the deceleration of the host vehicle in the non-brake operation is greater. The pedal erroneous operation determining unit 15 may use the threshold value to gradually decrease the second erroneous operation determination threshold value Th2.

In addition, the pedal erroneous operation determining unit 15 may decrease the second erroneous operation determination threshold value Th2 as the total traveling time from the engine start of the host vehicle is longer. The pedal erroneous operation determining unit 15 may decrease the second erroneous operation determination threshold value Th2 as the distance between the object in front of the host vehicle and the host vehicle is shorter. The pedal erroneous operation determining unit 15 may change the amount of change in the second erroneous operation determination threshold value Th2 depending on the kind of the object (the preceding vehicle or the pedestrian). The pedal erroneous operation determining unit 15 may use a plurality of threshold values to gradually decrease the second erroneous operation determination threshold value Th2 even in a case of using total traveling time from the engine start of the host vehicle or the distance between the object and the host vehicle.

In a case where the pedal erroneous operation determining unit 15 determines that the operation of the accelerator pedal is the erroneous operation, the pedal erroneous operation handling unit 16 performs the pedal erroneous operation acceleration suppression assistance that suppresses acceleration of the host vehicle due to the operation of the accelerator pedal. The pedal erroneous operation handling unit 16 performs the pedal erroneous operation acceleration suppression assistance by, for example, not reflecting the operation of the accelerator pedal determined to be the erroneous operation on the traveling of the host vehicle. As an example, the pedal erroneous operation handling unit 16 does not transmit the control signal to the drive actuator by the operation of the accelerator pedal determined to be the erroneous operation.

The pedal erroneous operation handling unit 16 may decelerate the host vehicle in addition to the suppression of the acceleration of the host vehicle in a case where the pedal erroneous operation determining unit determines that the operation of the accelerator pedal is the erroneous operation. The pedal erroneous operation handling unit 16 is not needed to set acceleration of the host vehicle due to the operation of the accelerator pedal to zero, and may perform acceleration of the host vehicle suppressed as compared with a case where the operation of the accelerator pedal is directly reflected on traveling of the host vehicle.

In a case where the pedal erroneous operation acceleration suppression assistance is performed, the pedal erroneous operation handling unit 16 may notify the driver that the pedal erroneous operation acceleration suppression assistance is performed or the operation of the accelerator pedal is determined to be the erroneous operation. The pedal erroneous operation handling unit 16 performs notification to the driver through outputting of the image on the display or outputting of the sound from the speaker by transmitting the control signal to the HMI 4.

Process in Driving Assistance Apparatus

A process in the driving assistance apparatus 100 according to the embodiment will be described with reference to the drawings. FIG. 2A is a flowchart showing an example of an erroneous operation determining process of an accelerator pedal. The erroneous operation determining process of the accelerator pedal is executed, for example, when the host vehicle is traveling. The driver may be able to switch the erroneous operation determining process between the on state and the off state.

As shown in FIG. 2A, the driving assistance ECU 10 of the driving assistance apparatus 100 causes the pedal erroneous operation determining unit 15 to determine whether the operation of the accelerator pedal by the driver is the erroneous operation in S10. The pedal erroneous operation determining unit 15 determines whether the operation of the accelerator pedal by the driver is the erroneous operation based on the first erroneous operation determination threshold value Th1 or the second erroneous operation determination threshold value Th2 and the rate of change in the operation amount of the accelerator pedal by the driver.

In a case where the pedal erroneous operation determining unit determines that the operation of the accelerator pedal by the driver is the erroneous operation (S10: YES), the driving assistance ECU 10 proceeds to S12. In a case where the pedal erroneous operation determining unit determines that the operation of the accelerator pedal by the driver is not the erroneous operation (S10: NO), the driving assistance ECU 10 ends the process. Thereafter, the driving assistance ECU 10 performs the determination of S10 again after the elapse of a certain time.

In S12, the driving assistance ECU 10 causes the pedal erroneous operation handling unit 16 to perform the pedal erroneous operation acceleration suppression assistance that suppresses acceleration of the host vehicle due to the operation of the accelerator pedal. The pedal erroneous operation handling unit 16 performs the pedal erroneous operation acceleration suppression assistance by, for example, not reflecting the operation of the accelerator pedal determined to be the erroneous operation on the traveling of the host vehicle.

FIG. 2B is a flowchart showing an example of an erroneous operation determination threshold value setting process. As shown in FIG. 2B, the driving assistance ECU 10 causes the situation determining unit 14 to determine whether the driver is in the pedal erroneous operation inducing situation in S20. The situation determining unit 14 determines whether the driver is in the pedal erroneous operation inducing situation based on at least one of the traveling situation of the host vehicle or the operation situation of the brake pedal by the driver, for example. A specific example of a determining process of a pedal erroneous operation inducing situation will be described below.

In a case where the situation determining unit determines that the driver is not in the pedal erroneous operation inducing situation (S20: NO), the driving assistance ECU 10 proceeds to S22. In a case where the situation determining unit determines that the driver is in the pedal erroneous operation inducing situation (S20: YES), the driving assistance ECU 10 proceeds to S24.

In S22, the driving assistance ECU 10 sets to use the first erroneous operation determination threshold value Th1 for the erroneous operation determination by the pedal erroneous operation determining unit 15. Thereafter, the driving assistance ECU 10 repeats the determination from S20 again after the elapse of a certain time.

In S24, the driving assistance ECU 10 sets to use the second erroneous operation determination threshold value Th2 for the erroneous operation determination by the pedal erroneous operation determining unit 15. The second erroneous operation determination threshold value Th2 is smaller than the first erroneous operation determination threshold value Th1. Thereafter, the driving assistance ECU 10 repeats the determination from S20 again after the elapse of a certain time.

Subsequently, a specific example of the determination on the pedal erroneous operation inducing situation will be described with reference to FIGS. 3A to 3C. FIG. 3A is a flowchart showing an example of a determining process of a pedal erroneous operation inducing situation based on the presence or absence of a vehicle speed adjustment assistance.

As shown in FIG. 3A, the driving assistance ECU 10 causes the situation determining unit 14 to determine whether the vehicle speed adjustment assistance is being executed in S30. The situation determining unit 14 recognizes whether the vehicle speed adjustment assistance is being executed based on a switch operation of switching the vehicle speed adjustment assistance between the on state and the off state. The situation determining unit 14 may indirectly recognize whether the vehicle speed adjustment assistance is being executed based on the operation situation of the brake pedal by the driver.

In a case where the situation determining unit determines that the vehicle speed adjustment assistance is not being executed (S30: NO), the driving assistance ECU 10 ends the process. In a case where the situation determining unit determines that the vehicle speed adjustment assistance is being executed (S30: YES), the driving assistance ECU 10 proceeds to S32.

In S32, the driving assistance ECU 10 causes the situation determining unit 14 to determine whether the driver is in the pedal erroneous operation inducing situation. Thereafter, the driving assistance ECU 10 proceeds to S24 shown in FIG. 2B described above.

FIG. 3B is a flowchart showing an example of a determining process of a pedal erroneous operation inducing situation based on a brake non-operating time. As shown in FIG. 3B, the driving assistance ECU 10 causes the situation determining unit 14 to determine whether the brake non-operating time during which the driver does not operate the brake pedal continues beyond a time determination threshold value in S40.

In a case where the situation determining unit determines that the brake non-operating time does not continue beyond the time determination threshold value (S40: NO), the driving assistance ECU 10 ends the process. In a case where the situation determining unit determines that the brake non-operating time continues beyond the time determination threshold value (S40: YES), the driving assistance ECU 10 proceeds to S42.

In S42, the driving assistance ECU 10 causes the situation determining unit 14 to determine whether the driver is in the pedal erroneous operation inducing situation. Subsequently, in S44, the driving assistance ECU 10 causes the pedal erroneous operation determining unit 15 to change the second erroneous operation determination threshold value Th2 depending on the brake non-operating time. The pedal erroneous operation determining unit 15 decreases the second erroneous operation determination threshold value Th2 as the brake non-operating time is longer. Thereafter, the driving assistance ECU 10 proceeds to S24 shown in FIG. 2B.

FIG. 3C is a flowchart showing an example of a determining process of a pedal erroneous operation inducing situation based on the deceleration of the host vehicle. As shown in FIG. 3C, the driving assistance ECU 10 determines whether the deceleration of the host vehicle in the non-brake operation by the driver is equal to or greater than the deceleration determination threshold value in S50.

In a case where the determination is made that the deceleration of the host vehicle in the non-brake operation is not equal to or greater than the deceleration determination threshold value (S50: NO), the driving assistance ECU 10 ends the process. In a case where the determination is made that the deceleration of the host vehicle in the non-brake operation is equal to or greater than the deceleration determination threshold value (S50: YES), the driving assistance ECU 10 proceeds to S52.

In S52, the driving assistance ECU 10 causes the situation determining unit 14 to determine that the driver is in the pedal erroneous operation inducing situation. Subsequently, in S54, the driving assistance ECU 10 causes the pedal erroneous operation determining unit 15 to change the second erroneous operation determination threshold value Th2 according to the deceleration of the host vehicle in the non-brake operation. The pedal erroneous operation determining unit 15 decreases the second erroneous operation determination threshold value Th2 as the deceleration of the host vehicle in the non-brake operation is greater. Thereafter, the driving assistance ECU 10 proceeds to S24 shown in FIG. 2B.

In the driving assistance apparatus 100 according to the present embodiment as described above, when the driver is in the pedal erroneous operation inducing situation in which the erroneous operation of the pedal is likely to occur, the operation of the accelerator pedal is likely to be determined to be the erroneous operation by using the second erroneous operation determination threshold value Th2 smaller than the first erroneous operation determination threshold value Th1 used when the driver is not in the pedal erroneous operation inducing situation, and the determination on the erroneous operation of the pedal can be appropriately performed based on the driver's situation. In the driving assistance apparatus 100, by setting the first erroneous operation determination threshold value Th1 used in a case where the situation determining unit determines that the driver is not in the pedal erroneous operation inducing situation to a greater value, unnecessary suppression of acceleration of the host vehicle that gives uncomfortable feeling when the driver actively drives the vehicle can be reduced.

In the driving assistance apparatus 100, in a case where the vehicle speed adjustment assistance of the host vehicle is performed, the frequency of operation of the brake pedal by the driver is reduced, and the possibility of erroneous operation of the accelerator pedal is considered to increase compared to the manual driving in which the accelerator pedal and brake pedal are frequently changed, and the situation determining unit determines that the driver is in the pedal erroneous operation inducing situation. Therefore, with the driving assistance apparatus 100, since the operation of the accelerator pedal is likely to be determined to be the erroneous operation in a case where the vehicle speed adjustment assistance of the host vehicle is performed, the determination on the erroneous operation of the pedal can be appropriately performed based on the driver's situation.

In the driving assistance apparatus 100, in a case where a state in which the driver does not operate the brake pedal continues for a long time, the possibility of erroneous operation of the accelerator pedal is considered to increase compared to a case where the accelerator pedal and brake pedal are frequently changed by the driver, and the situation determining unit determines that the driver is in the pedal erroneous operation inducing situation. Therefore, with the driving assistance apparatus 100, since the operation of the accelerator pedal is likely to be determined to be the erroneous operation in a case where a state in which the driver does not operate the brake pedal continues for a long time, the determination on the erroneous operation of the pedal can be appropriately performed based on the driver's situation.

With the driving assistance apparatus 100, since it can be considered that as the brake non-operating time is longer, the pedal operation of the driver is more rigid and the possibility of erroneous operation of the accelerator pedal increases, by decreasing the second erroneous operation determination threshold value Th2 as the brake non-operating time is longer, the driver's situation can be more appropriately reflected in the ease of erroneous operation determination.

In the driving assistance apparatus 100, in a case where the deceleration of the host vehicle is great when the driver is not operating the brake pedal, since the possibility that the driver's foot is placed on the accelerator pedal is considered to increase, the situation determining unit determines that the driver is in the pedal erroneous operation inducing situation. Therefore, with the driving assistance apparatus 100, since the operation of the accelerator pedal is likely to be determined to be the erroneous operation in a case where the deceleration of the host vehicle is great when the driver is not operating the brake pedal, the determination on the erroneous operation of the pedal can be appropriately performed based on the driver's situation.

With the driving assistance apparatus 100, since it is considered that as the deceleration of the host vehicle when the driver is not operating the brake pedal is greater, the possibility that the driver's foot is placed on the accelerator pedal to continue traveling of the host vehicle increases, by decreasing the second erroneous operation determination threshold value Th2 as the deceleration of the host vehicle is greater, the driver's situation can be more appropriately reflected in the ease of erroneous operation determination.

Although the embodiment of the disclosure has been described above, the disclosure is not limited to the embodiment described above. The disclosure can be implemented in various forms including various modifications and improvements based on the knowledge of those skilled in the art, including the above-described embodiment.

For example, the driving assistance apparatus 100 is not necessarily needed to be able to execute the vehicle speed adjustment assistance. The driving assistance ECU 10 may not have the vehicle speed adjustment assistance unit 13. In this case, the determination on the pedal erroneous operation inducing situation based on whether the vehicle speed adjustment assistance is performed is not performed. The situation determining unit 14 need only be able to execute the determination on the pedal erroneous operation inducing situation by at least any one of the methods.

In a case where the situation determining unit 14 determines that the driver is in the pedal erroneous operation inducing situation, the driving assistance ECU 10 may notify that the driver is in the pedal erroneous operation inducing situation (the operation of the accelerator pedal is likely to be determined to be the erroneous operation). The situation determining unit 14 performs notification to the driver through outputting of the image on the display or outputting of the sound from the speaker by transmitting the control signal to the HMI 4. The situation determining unit 14 can notify the driver that the operation of the accelerator pedal is likely to be determined to be the erroneous operation by displaying the icon corresponding to the pedal erroneous operation inducing situation on a multi-information display, for example.

The pedal erroneous operation determining unit 15 is not needed to change the second erroneous operation determination threshold value Th2 depending on the brake non-operating time or the like, and may set the second erroneous operation determination threshold value Th2 as a fixed value.

What is claimed is:

1. A driving assistance apparatus that suppresses acceleration of a host vehicle due to an operation of an accelerator pedal by a driver of the host vehicle in a case where the operation of the accelerator pedal is determined to be an erroneous operation, the driving assistance apparatus comprising:
a pedal erroneous operation determining unit configured to determine whether the operation of the accelerator pedal by the driver is the erroneous operation;
a pedal erroneous operation handling unit configured to suppress acceleration of the host vehicle in a case where the pedal erroneous operation determining unit determines that the operation of the accelerator pedal is the erroneous operation; and
a situation determining unit configured to determine whether the driver is in a pedal erroneous operation inducing situation based on at least one of a traveling situation of the host vehicle or an operation situation of a brake pedal by the driver, wherein:
the pedal erroneous operation determining unit is configured to, in a case where the situation determining unit determines that the driver is not in the pedal erroneous operation inducing situation, determine that the operation of the accelerator pedal is the erroneous operation when a rate of change in an operation amount of the accelerator pedal by the driver is equal to or greater than a first erroneous operation determination threshold value, and configured to, in a case where the situation determining unit determines that the driver is in the pedal erroneous operation inducing situation, determine that the operation of the accelerator pedal is the erroneous operation when the rate of change in the operation amount of the accelerator pedal by the driver is equal to or greater than a second erroneous operation determination threshold value; and
the second erroneous operation determination threshold value is smaller than the first erroneous operation determination threshold value,
wherein the situation determining unit is configured to determine that the driver is in the pedal erroneous operation inducing situation in a case where a deceleration of the host vehicle when the driver is not operating the brake pedal is equal to or greater than a deceleration determination threshold value.

2. The driving assistance apparatus according to claim 1, further comprising a vehicle speed adjustment assistance unit configured to perform a vehicle speed adjustment assistance of the host vehicle based on a surrounding environment in a periphery of the host vehicle and the traveling situation of the host vehicle.

3. The driving assistance apparatus according to claim 1, wherein the pedal erroneous operation determining unit is configured to decrease the second erroneous operation determination threshold value as the deceleration of the host vehicle is greater in a case where the situation determining unit determines that the driver is in the pedal erroneous operation inducing situation based on the deceleration of the host vehicle when the driver is not operating the brake pedal being equal to or greater than the deceleration determination threshold value.

* * * * *